(12) United States Patent
Büddefeld et al.

(10) Patent No.: US 12,420,935 B2
(45) Date of Patent: Sep. 23, 2025

(54) AIRCRAFT ICE DETECTION

(71) Applicant: THE BOEING COMPANY, Chicago, IL (US)

(72) Inventors: Michael Christian Büddefeld, Hessen (DE); Miriam Cornel, Bavaria (DE); Stuart Cocks, Fareham (GB); Millie Irene Sterling, Wiesbaden (DE); Andres Munoz Hernandez, Bayern (DE)

(73) Assignee: The Boeing Company, Arlington, VA (US)

( * ) Notice: Subject to any disclaimer, the term of this patent is extended or adjusted under 35 U.S.C. 154(b) by 394 days.

(21) Appl. No.: 18/060,370

(22) Filed: Nov. 30, 2022

(65) Prior Publication Data

US 2024/0174366 A1    May 30, 2024

(51) Int. Cl.
| | | |
|---|---|---|
| *G06K 9/48* | (2006.01) | |
| *B64D 11/00* | (2006.01) | |
| *B64D 15/20* | (2006.01) | |
| *B64D 45/00* | (2006.01) | |
| *B64D 47/08* | (2006.01) | |

(Continued)

(52) U.S. Cl.
CPC .......... *B64D 15/20* (2013.01); *B64D 11/0015* (2013.01); *B64D 45/00* (2013.01); *B64D 47/08* (2013.01); *G06V 10/56* (2022.01); *G06V 10/60* (2022.01); *G06V 10/764* (2022.01); *G06V 20/56* (2022.01)

(58) Field of Classification Search
None
See application file for complete search history.

(56) References Cited

U.S. PATENT DOCUMENTS 5,180,122 A * 1/1993 Christian .................. B64F 5/20
                                                            340/905
6,437,355 B1 * 8/2002 Nishino ................. G01B 11/06
                                                          250/559.34

(Continued)

FOREIGN PATENT DOCUMENTS

CN    108665499 A  * 10/2018 ............. G06T 7/593
CN    115063389 A  *  9/2022

(Continued)

OTHER PUBLICATIONS

Cao et al., "Aircraft icing: An ongoing threat to aviation safety." Aerospace science and technology 75 (2018): 353-385. (Year: 2018).*

(Continued)

*Primary Examiner* — Feng Niu
(74) *Attorney, Agent, or Firm* — Moore IP Law

(57) ABSTRACT

A method of detecting ice on a surface of an aircraft includes obtaining a first series of images captured by one or more cameras onboard the aircraft. The method also includes performing data reduction operations to generate a second series of images. The method further includes generating feature data based on the second series of images, where the feature data is indicative of changes over time of pixel data of the second series of images. The method also includes generating, based on the feature data, input data for a trained classifier and determining, using the trained classifier, whether ice is present on one or more surfaces of the aircraft.

20 Claims, 9 Drawing Sheets

(51) Int. Cl.
  *G06V 10/56* (2022.01)
  *G06V 10/60* (2022.01)
  *G06V 10/764* (2022.01)
  *G06V 20/56* (2022.01)

(56) References Cited

U.S. PATENT DOCUMENTS

| | | | | |
|---|---|---|---|---|
| 7,085,401 | B2* | 8/2006 | Averbuch | G06T 7/174 |
| | | | | 382/199 |
| 7,864,980 | B2* | 1/2011 | Evans | G06T 7/20 |
| | | | | 348/169 |
| 8,169,470 | B2* | 5/2012 | Ishihara | A61B 1/00186 |
| | | | | 348/70 |
| 8,355,532 | B2* | 1/2013 | Gillard | G06V 20/00 |
| | | | | 348/94 |
| 8,363,980 | B2* | 1/2013 | Beresford | G06T 7/80 |
| | | | | 382/293 |
| 8,872,917 | B1* | 10/2014 | Rozenboim | H04N 5/913 |
| | | | | 348/143 |
| 9,014,462 | B2* | 4/2015 | Yamada | G06T 7/11 |
| | | | | 382/154 |
| 9,037,392 | B2* | 5/2015 | Kirk | G08G 5/51 |
| | | | | 701/13 |
| 9,227,733 | B2* | 1/2016 | Meis | G01N 1/2214 |
| 9,418,562 | B2* | 8/2016 | Frolik | H04B 7/18508 |
| 9,565,377 | B2* | 2/2017 | Hamann | H04N 23/698 |
| 9,569,831 | B2* | 2/2017 | Song | G06T 1/005 |
| 9,875,409 | B2* | 1/2018 | Ohmura | G06V 10/7788 |
| 10,018,609 | B2* | 7/2018 | Miller | G06V 10/143 |
| 10,160,550 | B1* | 12/2018 | Somanath | G06V 10/764 |
| 10,354,536 | B1* | 7/2019 | Hegranes | G08G 5/59 |
| 10,430,890 | B1* | 10/2019 | Corder | G06Q 40/08 |
| 10,537,910 | B2* | 1/2020 | Rudnick, III | B05B 13/0431 |
| 10,669,035 | B2* | 6/2020 | Meis | B64D 15/20 |
| 11,037,051 | B2* | 6/2021 | Kim | G06F 18/21 |
| 11,727,587 | B2* | 8/2023 | Pugh | G06T 19/006 |
| | | | | 382/285 |
| 11,783,575 | B2* | 10/2023 | Billhartz | G06F 18/2431 |
| 11,893,714 | B2* | 2/2024 | Ramanathan | G06V 20/52 |
| 11,922,331 | B2* | 3/2024 | Plawecki | G06N 5/04 |
| 12,154,197 | B2* | 11/2024 | Yaghoobi | G06V 30/416 |
| 2003/0081836 | A1* | 5/2003 | Averbuch | G06T 7/12 |
| | | | | 382/199 |
| 2005/0104841 | A1* | 5/2005 | Sohn | G09G 3/3406 |
| | | | | 345/102 |
| 2006/0109341 | A1* | 5/2006 | Evans | G08B 21/0476 |
| | | | | 348/14.08 |
| 2007/0046778 | A1* | 3/2007 | Ishihara | A61B 1/0638 |
| | | | | 348/68 |
| 2009/0060321 | A1* | 3/2009 | Gillard | G06T 7/20 |
| | | | | 382/154 |
| 2009/0067668 | A1* | 3/2009 | Beresford | G06T 7/80 |
| | | | | 382/100 |
| 2010/0019151 | A1* | 1/2010 | Shimizu | H04N 25/587 |
| | | | | 250/330 |
| 2012/0274634 | A1* | 11/2012 | Yamada | G06T 7/187 |
| | | | | 345/419 |
| 2014/0081567 | A1* | 3/2014 | Kirk | G08G 5/21 |
| | | | | 701/301 |
| 2014/0184789 | A1* | 7/2014 | Meis | G01N 1/2214 |
| | | | | 348/135 |
| 2014/0320607 | A1* | 10/2014 | Hamann | G06T 7/215 |
| | | | | 348/47 |
| 2015/0310747 | A1* | 10/2015 | Frolik | H04B 7/18506 |
| | | | | 340/971 |
| 2016/0034784 | A1* | 2/2016 | Ohmura | G06T 7/254 |
| | | | | 382/103 |
| 2016/0078584 | A1* | 3/2016 | Song | G06T 3/4038 |
| | | | | 382/100 |
| 2016/0117844 | A1* | 4/2016 | Beymore | G01J 3/463 |
| | | | | 382/162 |
| 2016/0178593 | A1* | 6/2016 | Miller | G06V 10/143 |
| | | | | 382/191 |
| 2016/0334546 | A1* | 11/2016 | Ma | G01W 1/00 |
| 2017/0287196 | A1* | 10/2017 | Raeburn | G06T 15/506 |
| 2018/0065134 | A1* | 3/2018 | Rudnick, III | B05B 13/0431 |
| 2018/0113200 | A1* | 4/2018 | Steinberg | G08G 1/166 |
| 2018/0321386 | A1* | 11/2018 | Bosetti | G01S 17/95 |
| 2019/0208136 | A1* | 7/2019 | Wendel | H04N 23/951 |
| 2019/0225346 | A1* | 7/2019 | Calmels | G06N 5/01 |
| 2019/0270521 | A1* | 9/2019 | Meis | B64D 15/20 |
| 2019/0333298 | A1* | 10/2019 | Couturier | G06V 20/635 |
| 2020/0025690 | A1* | 1/2020 | Koshihara | G06F 18/2433 |
| 2020/0167943 | A1* | 5/2020 | Kim | G06T 7/579 |
| 2020/0211175 | A1* | 7/2020 | Kunik | G01N 21/95 |
| 2020/0387742 | A1* | 12/2020 | Steenhoek | G06N 5/01 |
| 2021/0118310 | A1* | 4/2021 | Kohashi | G06F 18/214 |
| 2021/0142497 | A1* | 5/2021 | Pugh | G06T 7/194 |
| 2021/0157561 | A1* | 5/2021 | Gilton | B64D 45/00 |
| 2021/0201535 | A1* | 7/2021 | Steenhoek | G06T 7/90 |
| 2021/0309387 | A1* | 10/2021 | Decoux | G05D 1/2435 |
| 2021/0374967 | A1* | 12/2021 | Ramanathan | G06T 7/194 |
| 2022/0028287 | A1* | 1/2022 | Durant | G06Q 10/047 |
| 2022/0067369 | A1* | 3/2022 | Billhartz | G06T 7/11 |
| 2022/0067542 | A1* | 3/2022 | Plawecki | G06N 5/04 |
| 2022/0215605 | A1* | 7/2022 | Yaghoobi | G06V 30/414 |
| 2022/0284515 | A1* | 9/2022 | Corder | G06T 7/90 |
| 2022/0366581 | A1* | 11/2022 | Perisse | G06T 7/194 |
| 2022/0381615 | A1* | 12/2022 | Bischoff | G06V 10/56 |
| 2022/0411105 | A1* | 12/2022 | Walsh | B60K 35/00 |
| 2023/0219698 | A1* | 7/2023 | Campbell | B64D 43/00 |
| | | | | 701/3 |
| 2024/0046485 | A1* | 2/2024 | Ramanathan | G06T 7/248 |
| 2024/0297962 | A1* | 9/2024 | Ko | G09G 5/38 |
| 2024/0369712 | A1* | 11/2024 | Akamatsu | G01S 17/931 |

FOREIGN PATENT DOCUMENTS

JP 2021052350 A * 4/2021
WO WO-2021078666 A1 * 4/2021 ............ G06T 7/0004

OTHER PUBLICATIONS

CN 115063389 A (machine translation) (Year: 2022).*
CN 108665499 A (machine translation) (Year: 2018).*
WO 2021078666 A1 (machine translation) (Year: 2021).*
JP-2021052350-A (machine translation) (Year: 2021).*

* cited by examiner

AIRCRAFT ICE DETECTION

FIELD OF THE DISCLOSURE

The present disclosure is generally related to detecting ice on one or more surfaces of an aircraft.

BACKGROUND

In particular weather conditions, ice can develop on flight surfaces of an aircraft, which can be detrimental to flight characteristics of the aircraft. Many commercial aircraft have onboard systems that are used for ice mitigation during a flight. However, ice mitigation before takeoff generally uses ground-based deicing equipment. Ground-based deicing is time consuming. Ground-based ice detection is commonly performed manually during a walk-around inspection of the aircraft and can include visual and tactile checks. Such manual ground ice detection checks are a challenging task given the size and height of commercial aircraft, as well as occasional poor weather and lighting conditions that can occur when icing is of concern. An additional challenge when using manual checks for ice detection is that information about icing is not available until the walk-around check is performed, which can lead to delays if icing is detected.

SUMMARY

In a particular implementation, an aircraft includes one or more cameras configured to generate a first series of images. The aircraft also includes one or more processors. The one or more processors are configured to perform data reduction operations on the first series of images to generate a second series of images. The one or more processors are further configured to generate feature data based on the second series of images, where the feature data is indicative of changes over time of pixel data of the second series of images. The one or more processors are also configured to generate, based on the feature data, input data for a trained classifier and determine, using the trained classifier, whether ice is present on one or more surfaces of the aircraft.

In another particular implementation, a method includes obtaining a first series of images captured by one or more cameras onboard an aircraft. The method also includes performing data reduction operations to generate a second series of images. The method further includes generating feature data based on the second series of images, where the feature data is indicative of changes over time of pixel data of the second series of images. The method also includes generating, based on the feature data, input data for a trained classifier and determining, using the trained classifier, whether ice is present on one or more surfaces of the aircraft.

In another particular implementation, a computing device includes one or more processors configured to obtain a first series of images captured by one or more cameras onboard an aircraft. The one or more processors are further configured to perform data reduction operations on the first series of images to generate a second series of images. The one or more processors are further configured to generate feature data based on the second series of images, where the feature data is indicative of changes over time of pixel data of the second series of images. The one or more processors are further configured to generate, based on the feature data, input data for a trained classifier and to determine, using the trained classifier, whether ice is present on one or more surfaces of the aircraft.

The features, functions, and advantages described herein can be achieved independently in various implementations or may be combined in yet other implementations, further details of which can be found with reference to the following description and drawings.

DETAILED DESCRIPTION

Figure 1:
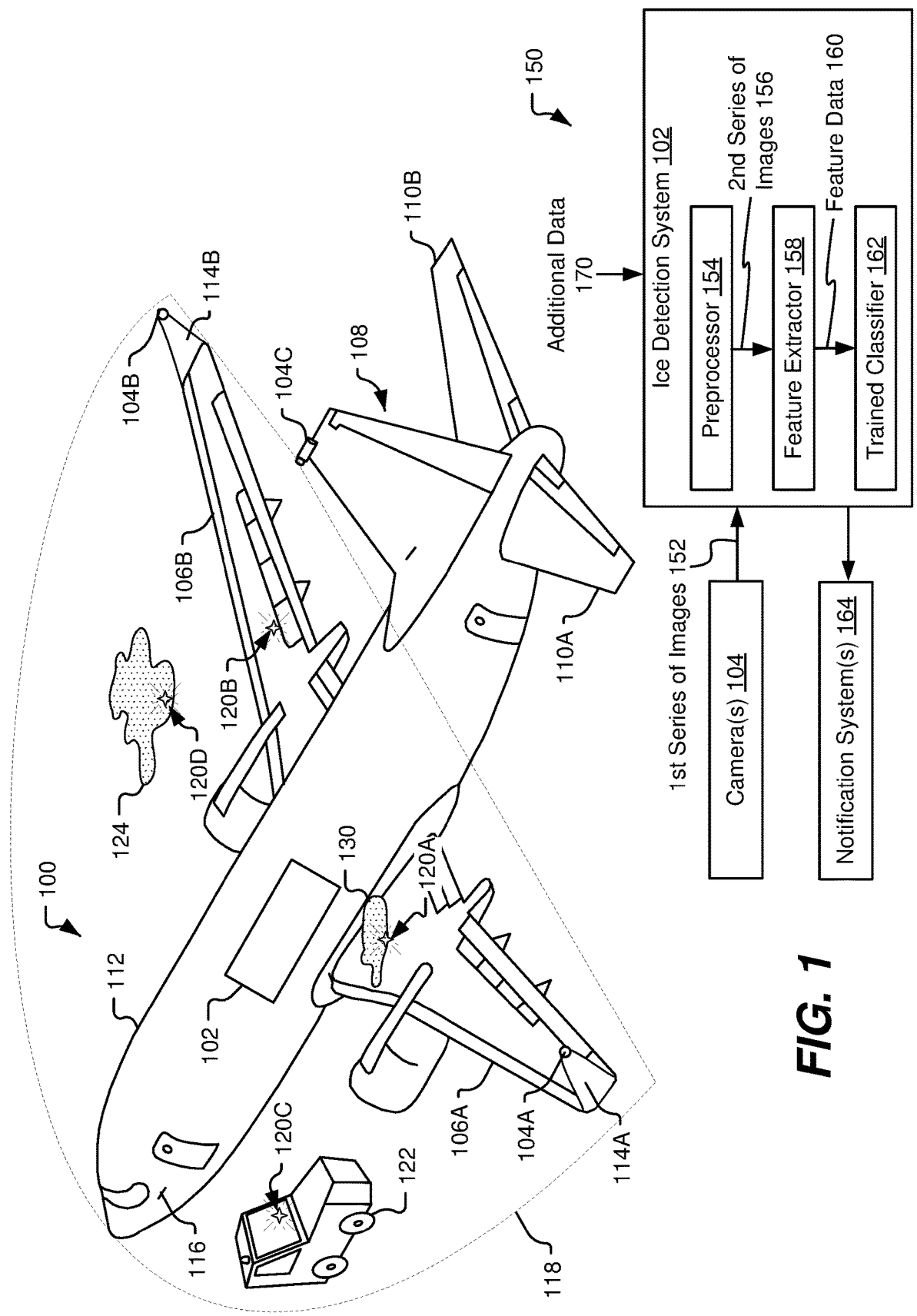
FIG. 1 is a diagram that illustrates particular aspects of a system that includes an aircraft and an ice detection system according to one or more implementations.

Aspects disclosed herein present systems and methods for ice detection on surfaces of an aircraft. In particular, one or more onboard cameras are used to gather image data, which is processed to generate feature data that represents information determined based on multiple images of a series of images. The feature data is input to one or more trained machine-learning models to determine whether ice is present on a surface of the aircraft. For example, icing conditions may be detected based on one or more specific patterns over time in pixel data of the series of images. The trained machine-learning model(s) are operable to categorize patterns in the pixel data over time to detect ice.

An ice detection system according to particular aspects disclosed herein detects changes in visual parameters on the surfaces of the aircraft (e.g., wings, fuselage, etc.) to detect ice. The system can account for various illumination conditions in order to detect ice under natural illumination or artificial illumination. In a particular implementation, the system uses one or more conventional digital cameras (e.g., as distinct from specialty cameras such as hyperspectral or infrared imaging cameras). As one example, the system can use one or more cameras installed on a tail structure of an aircraft. Many aircraft have cameras disposed on the tail structure or at other locations for other purposes (e.g., ground maneuvering and/or inflight entertainment), and the ice detection system can generally use images capture by these pre-existing cameras, thereby reducing the need to install extra equipment on the aircraft.

In implementations in which the ice detection system uses pre-existing cameras onboard an aircraft, implementing the ice detection system adds little or no weight to the aircraft. Additionally, the ice detection system can be implemented entirely onboard the aircraft, eliminating the need for (or at least significantly reducing use of) ground-based inspection equipment for ice detection. Further, since the ice detection system can be integrated onboard the aircraft, ice inspections can be performed at any location. For example, under some circumstances, an aircraft can experience significant delay between leaving a departure gate and takeoff (e.g., due to weather delays or other traffic). In such circumstances, if the aircraft is delayed long enough, there can be uncertainty as to whether ice has formed after the aircraft was inspected at the gate (or at a deicing station). The disclosed onboard ice detection system enables real-time inspection under such circumstances, thereby avoiding an additional delay for an unnecessary ice inspection. In some implementations, the trained machine-learning model(s) can be trained to perform related classification tasks, such as checking for the presence of anti-icing fluid on the wings.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, multiple cameras are illustrated and associated with reference numbers 104A, 104B, and 104C. When referring to a particular one of these cameras, such as the camera 104A, the distinguishing letter "A" is used. However, when referring to any arbitrary one of these cameras or to these cameras as a group, the reference number 104 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 1 depicts an aircraft 100 including one or more cameras (i.e., "camera(s)" 104 in FIG. 1), which indicates that in some implementations the aircraft 100 includes a single camera 104 and in other implementations the aircraft 100 includes multiple cameras 104. For ease of reference herein, such features are generally introduced as "one or more" features, and are subsequently referred to in the singular unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 is a diagram that illustrates particular aspects of a system that includes an aircraft 100 and an ice detection system 102 according to one or more implementations. In the example illustrated in FIG. 1, the aircraft 100 includes a wing 106A, a wing 106B, a tail structure 108, and horizontal stabilizers 110 coupled to a fuselage 112. In this example, each wing 106 includes a wingtip structure 114, such as a winglet or another wingtip device. The specific configuration of the aircraft 100 shown in FIG. 1 is merely illustrative of one non-limiting example. In other implementations, the aircraft 100 can have a different configuration, such as a configuration including one or more canards, a multi-tail structure, etc.

In a particular aspect, one or more cameras 104 are disposed on the aircraft 100 and configured to capture images of an exterior of the aircraft 100. For example, in FIG. 1, the aircraft 100 includes a camera 104A coupled to a wingtip structure 114A, a camera 104B coupled to a wingtip structure 114B, and a camera 104C coupled to the tail structure 108. In other implementations, the aircraft 100 includes more cameras 104, fewer cameras 104, or the cameras 104 are located on different portions of the aircraft 100. One or more of the cameras 104 may be positioned to facilitate ground maneuvering. For example, the camera 104C has a field of view 118 that enables the camera 104C to capture images that include each wing 106, a forward portion of the fuselage 112, and some ground features near the aircraft 100 to facilitate ground maneuvering. The camera 104A has a field of view that includes at least a portion of the wing 106A, a portion of tail structure 108, a portion of a horizontal stabilizer 110A, or combinations thereof. Likewise the camera 104B has a field of view that includes at least a portion of the wing 106B, a portion of tail structure 108, a portion of a horizontal stabilizer 110B, or combinations thereof. One or more of the cameras 104 are also coupled to other aircraft systems, such as an inflight entertainment system.

Figure 8:
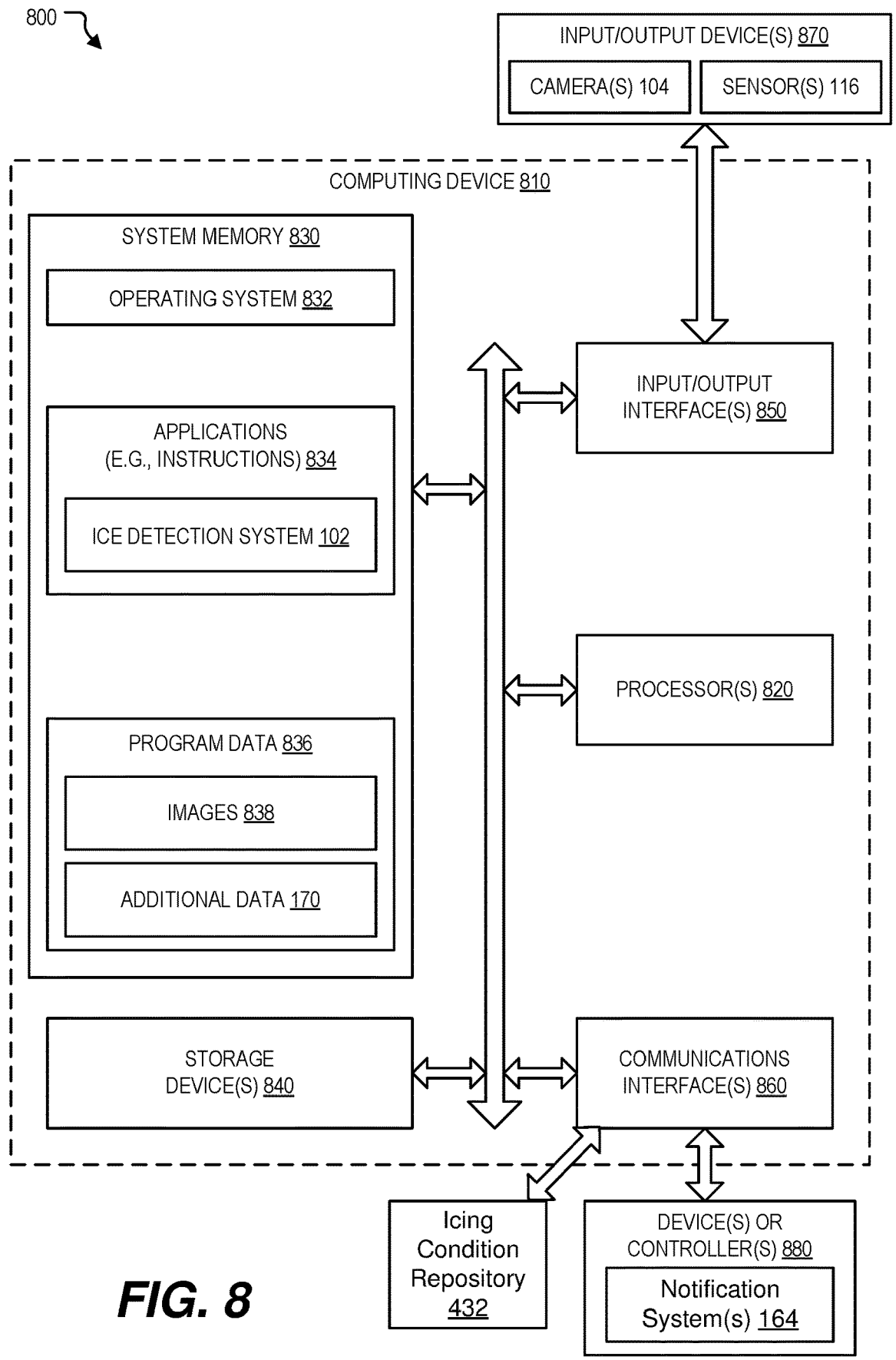
FIG. 8 is a block diagram of a computing environment including a computing device configured to support aspects of computer-implemented methods and computer-executable program instructions (or code) according to the present disclosure.

In the example illustrated in FIG. 1, the ice detection system 102 includes, corresponds to, or is included within one or more line replaceable units (LRUs) onboard the aircraft 100. For example, the ice detection system 102 may be integrated within a computing device that includes one or more processors, memory, and interfaces to couple to other devices onboard the aircraft 100 (e.g., the inflight entertainment system, flightdeck displays, etc.), to devices offboard the aircraft 100 (e.g., a deicing scheduling system or airport traffic management system), or both. One example of such a computing device is illustrated in FIG. 8.

As illustrated in an inset diagram 150 of FIG. 1, the ice detection system 102 is coupled to the camera(s) 104 to receive images. The images are processed to detect ice on surfaces of the aircraft 100 (such as on the wings 106, tail structure 108, horizontal stabilizers 110, or fuselage 112). In the example illustrated in FIG. 1, the ice detection system 102 is also coupled to one or more notification systems 164. In this example, the ice detection system 102 is configured to generate signals to the notification system(s) 164 to indicate whether the ice detection system 102 detects ice on a surface of the aircraft 100.

In a particular implementation, the ice detection system 102 includes a preprocessor 154, a feature extractor 158, and a trained classifier 162. The preprocessor 154 is operable to obtain a first series of images 152 generated by the camera(s) 104 and to perform one or more data reduction operations to generate a second series of images 156 based on the first series of images 152. Each series of images 152, 156 represent a time series, such as a portion of video including multiple images. In some implementations, each series of images 152, 156 includes images from multiple cameras of the cameras 104. However, in other implementations, each series of images 152, 156 includes images from only a single camera of the camera(s) 104.

The data reduction operations performed by the preprocessor 154 include, for example, reducing the number of images in the second set of images 156 relative to the first set of images 152. To illustrate, one or more images of the first series of images 152 may be omitted from the second series of images 156. As one example, the second series of images 156 may include each Nth image from the first series of images 152, where N is an integer greater than one. As another example, the second series of images 156 may omit each Nth image from the first series of images 152, where N is an integer greater than one. As yet another example, images of the first series of images 152 are omitted in a manner that is not evenly spaced. To illustrate, images with particular features, such as particular lighting conditions, are omitted from the second series of images 156.

Additionally, or alternatively, the data reduction operations performed by the preprocessor 154 include reducing a count of pixels in one or more of the images. To illustrate, the data reduction operations include combining pixel data values of two or more pixels of a first image of the first series of images 152 to generate a first image of the second series of images 156. As another illustrative example, the data reduction operations include masking out pixels that are not relevant to ice detection. For example, the data reduction operations for a particular image include removing, from the particular image, pixel data that does not depict a surface of the aircraft 100.

The feature extractor 158 is operable to generate feature data 160 based on the second series of images 156 and possibly other data. For example, the feature extractor 158 may be configured to extract pixel data (or components thereof) from images of the second series of images 156 and to generate features sequences based on the pixel data. In this example, the feature data 160 includes the feature sequences. Examples of feature sequences include changes over time in illumination, color, color distribution, etc. In some implementations, the feature extractor 158 is also configured to detect sparkling in the second series of images 156. For example, the feature extractor 158 may detect sets of adjacent pixels that have large, rapid changes in illumination. In such implementations, the feature data 160 includes information indicating locations associated with sparkling.

In some implementations, the feature extractor 158 is configured to generate input data for the trained classifier 162 based on the feature data 160. For example, the feature extractor 158 may include an embedding network that is configured to generate, as the input data for the trained classifier, a sequence of embedding vectors representing the feature data 160. As another example, the feature extractor 158 may generate the input data by combining the feature data 160 associated with the second series of images 156 with other data, such as data from one or more sensors 116 onboard the aircraft 100, or information from data sources offboard the aircraft 100. In still other examples, the input data corresponds to or includes at least a portion of the feature data 160.

The trained classifier 162 is operable to determine, based on the input data, whether ice is present on one or more surfaces of the aircraft 100. The trained classifier 162 is a machine-learning model that has been trained, using labeled training data, to detect ice on the surfaces of the aircraft 100 based at least partially on information extracted from images captured by the cameras 104. For example, the labeled training data may include a large corpus of sequences of images representing various lighting conditions, various times of day, various weather conditions, various locations, various ice conditions, and possibly differences in other conditions. Each sequence of images is associated with label data indicating whether ice is present on a surface of the aircraft depicted in the sequence of images. In this example, using machine-learning optimization processes, the machine-learning model is trained to determine, based on data representing an input sequence of images, whether ice is present on a surface of an aircraft in the sequence of images.

As used herein, the term "machine learning" should be understood to have any of its usual and customary meanings within the fields of computer science and data science, such meanings including, for example, processes or techniques by which one or more computers can learn to perform some operation or function without being explicitly programmed to do so. As a typical example, machine learning can be used to enable one or more computers to analyze data to identify patterns in data and generate a result based on the analysis.

For certain types of machine learning, the results that are generated include a data model (also referred to as a "machine-learning model" or simply a "model"). Typically, a model is generated using a first data set to facilitate analysis of a second data set. For example, a set of historical data is used to generate a model that is used to analyze future data.

Since a model is used to evaluate a set of data that is distinct from the data used to generate the model, the model is viewed as a type of software (e.g., instructions, parameters, or both) that is automatically generated by the computer(s) during the machine learning process. As such, the model is portable (e.g., generated at a first computer, and subsequently moved to a second computer for further training, for use, or both).

Examples of machine-learning models include, without limitation, perceptrons, neural networks, support vector machines, regression models, decision trees, Bayesian models, Boltzmann machines, adaptive neuro-fuzzy inference systems, as well as combinations, ensembles and variants of these and other types of models. Variants of neural networks include, for example and without limitation, prototypical networks, autoencoders, transformers, self-attention networks, convolutional neural networks, deep neural networks, deep belief networks, recurrent networks, etc. Variants of decision trees include, for example and without limitation, random forests, boosted decision trees, etc.

Since machine-learning models are generated by computer(s) based on input data, machine-learning models can be discussed in terms of at least two distinct time windows— (1) a creation/training phase and (2) a runtime phase. During the creation/training phase, a model is created, trained, adapted, validated, or otherwise configured by the computer based on the input data (which in the creation/training phase, is generally referred to as "training data"). Note that the trained model corresponds to software that has been generated and/or refined during the creation/training phase to perform particular operations, such as classification, prediction, encoding, or other data analysis or data synthesis operations. During the runtime phase (or "inference" phase), the model is used to analyze input data to generate model output. The content of the model output depends on the type of model. For example, a model can be trained to perform classification tasks or regression tasks, as non-limiting examples.

In the context of machine learning, "training" refers to adapting the model or parameters of the model to a particular data set. Unless otherwise clear from the specific context, the term "training" as used herein includes "re-training" or refining a model for a specific data set. For example, training includes so-called "transfer learning." In transfer learning, a base model is trained using a generic or typical data set, and the base model is subsequently refined (e.g., re-trained or further trained) using a more specific data set.

Training a model based on a training data set involves changing parameters of the model with a goal of causing the output of the model to have particular characteristics based on data input to the model. Model training is referred to herein as optimization or optimization training. In this context, "optimization" refers to improving a metric, and does not mean finding an ideal (e.g., global maximum or global minimum) value of the metric. Examples of optimization trainers include, without limitation, backpropagation trainers, derivative free optimizers (DFOs), and extreme learning machines (ELMs). As one example of training a model, during supervised training of a neural network, an input data sample is associated with a label. When the input data sample is provided to the model, the model generates output data, which is compared to the label associated with the input data sample to generate an error value. Parameters of the model are modified in an attempt to reduce (e.g., optimize) the error value.

During training of a machine-learning model to generate the trained classifier 162, images of the labeled training data are subject to the same preprocessing and feature extraction operations as are used by the ice detection system 102 to detect ice. Training the machine-learning model using sequences of images representing various lighting conditions, various times of day, various weather conditions, various locations, and possibly differences in other conditions, as well as various icing conditions, enables the trained classifier 162 to distinguish changes related to icing from other changes that occur in a sequence of images.

FIG. 1 depicts several examples of sparkling conditions that appear similar to ice and that the ice detection system 102 can distinguish from sparkle at a location 120A due to ice 130 on a surface of the aircraft 100. For example, in FIG. 1, a portion of a surface of the aircraft can sparkle (at location 120B) due to exposed metal on the surface or reflective paint or appliques on the surface (e.g., safety stickers). In this example, the location 120B would be expected to sparkle under particular illumination independently of weather conditions, as such, the trained classifier 162 can be trained to distinguish that sparkle at the location 120B is not due to ice by including images representing sparkle at the location 120B during various non-icing weather conditions. As another example, the portion of the surface at location 120B sparkles due to liquid on the surface. In this example, the trained classifier 162 is trained to distinguish that the sparkle at the location 120B is not due to ice by including, in the labeled training data, weather condition data associated with sequences of images representing sparkle due to liquid or ice on a roadway surface.

Other examples of sparkling conditions in FIG. 1 include reflections (at location 120C) from ground equipment 122 and reflections (at location 120D) from ice or liquid 124 that is not on a surface of the aircraft 100. In some implementations, the preprocessor 154, the feature extractor 158, or both, are configured to omit pixel data related to portions of each image that do not depict a portion of the aircraft 100 from the input data to the trained classifier 162. In such implementations, components of the ice detection system 102 other than the trained classifier 162 cause the ice detection system 102 to ignore the locations 120C and 120D.

In other implementations, the trained classifier 162 is trained to not generate an indication that ice is detected based on portions of an image that do not depict portions of the aircraft 100. For example, the labeled training data can include examples of images that include ice or liquid 124 on the ground and/or reflections from ground equipment, and the machine-learning training process can train the machine-learning model such that such images do not result in the trained classifier 162 indicating that ice is present on a surface of the aircraft 100 when such conditions are present in input data provided to the trained classifier 162.

In particular implementations, additional data 170 is provided to the ice detection system 102 to facilitate ice detection. For example, the additional data 170 may include sensor data from the sensor(s) 116. In this example, the sensor data may indicate weather conditions at a location of the aircraft 100, such as an ambient temperature, whether precipitation is occurring, humidity, or other weather information related to the location of the aircraft 100.

In some implementations, the additional data 170 may also, or alternatively, include information from other onboard systems of the aircraft 100, such as a data indicating a type of the aircraft 100, an operator of the aircraft 100, a time of day, a time of year, a location of the aircraft 100, or other information relevant to whether ice is expected, expected content of images, or which portions of an image correspond to portions of the aircraft 100. For example, the ice detection system 102 may use the data indicating an operator of the aircraft and the aircraft type to determine or estimate a configuration of the aircraft, which indicates which pixels in an image correspond to portions of the aircraft 100. In some examples, the operator of the aircraft and the aircraft type may provide information about a base color of paint on surfaces of the aircraft, which may facilitate identification of changes from expected pixel values related to such surfaces. Other information such as time of day, time of year, and location can be related to changes in illumination, which influence detection of ice.

In FIG. 1, if the ice detection system 102 detects ice (or suspected ice) on a surface of the aircraft 100, the ice detection system 102 sends an alert to the notification system(s) 164. In some implementations, the notification system(s) 164 includes a flightdeck information system that is configured to notify flight crew of a possibility of presence of ice on one or more surfaces of the aircraft 100. In the same or different implementations, the notification system(s) 164 include one or more ground systems, such as an airport traffic management system or a deicing dispatch system. In the same or different implementations, the ice detection system 102 is also configured to send information about icing conditions (e.g., ice detected, no ice detected, and other related data) to an icing condition repository to facilitate future scheduling of deicing operations.

By using pre-existing, conventional digital cameras, the ice detection system 102 adds little or no weight to the aircraft 100. Additionally, the ice detection system 102 significantly reduces the time and resources (e.g., ground-based inspection equipment) used for ice detection. Further, since the ice detection system 102 uses onboard systems of the aircraft 100 to detect ice, ice inspections can be performed at any location, such as on a taxiway after an extended takeoff delay, which can reduce delays while also improving safety.

Although FIG. 1 depicts the ice detection system 102 as disposed onboard the aircraft 100, in other implementations, the ice detection system 102 is remote from the aircraft 100. For example, a transmitter onboard the aircraft 100 can send the first series of images 152 from the camera(s) 104 onboard the aircraft 100 to a remote computing device (e.g., a computer at the same airport as the aircraft 100 or a remote server or cloud computing system) that includes the ice detection system 102.

Although the preprocessor 154, the feature extractor 158, and the trained classifier 162 are depicted as separate components of the ice detection system 102, in other implementations the described functionality of two or more of the preprocessor 154, the feature extractor 158, and the trained classifier 162 are combined. In some implementations, each of the preprocessor 154, the feature extractor 158, and the trained classifier 162 are represented in hardware, such as via an application-specific integrated circuit (ASIC) or a field-programmable gate array (FPGA), or the operations described with reference to the preprocessor 154, the feature extractor 158, and the trained classifier 162 are performed by a processor executing computer-readable instructions.

FIGS. 2A, 2B, 2C, and 2D are diagrams that illustrate particular aspects of data reduction operations performable by the ice detection system of FIG. 1 according to one or more implementations. In particular, FIGS. 2A-2D illustrate one example of operations to reduce a count of pixels in an image without omitting information that is relevant to ice detection. In a particular implementation, the preprocessor 154 of FIG. 1 performs the operations described with reference to FIGS. 2A-2D to generate an image (e.g., image 260 of FIG. 2D) of the second series of images 156 based on an image (e.g., image 200 of FIG. 2A) of the first series of images 152.

Figure 2A:
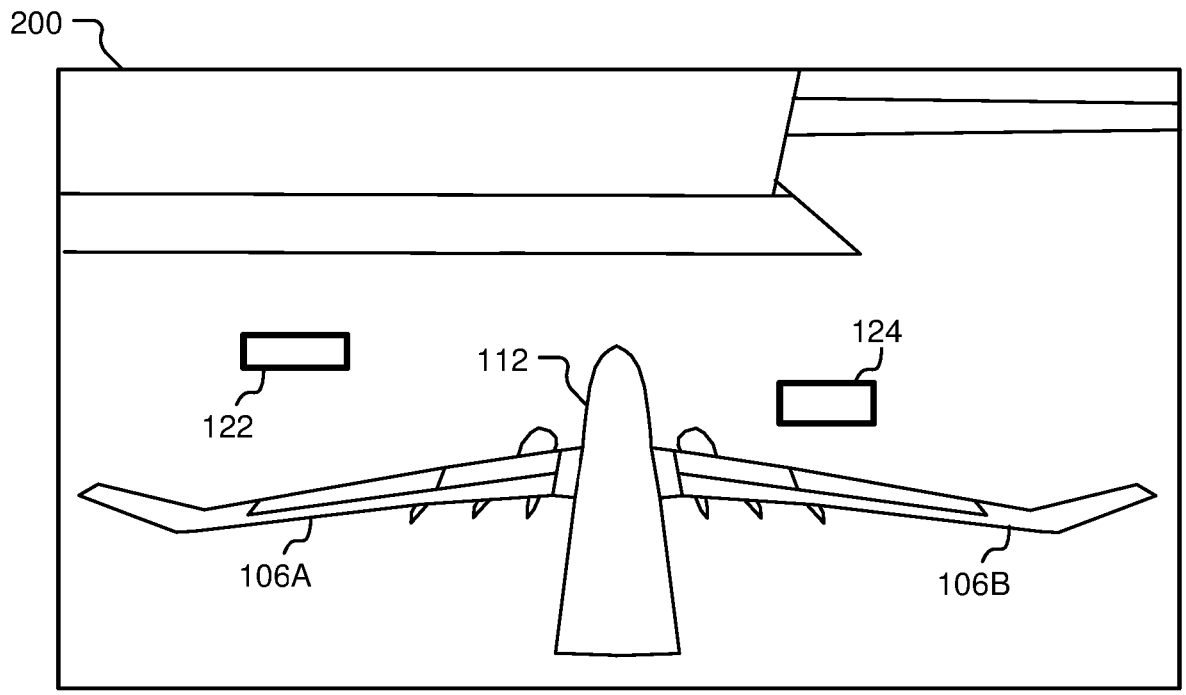
FIGS. 2A, 2B, 2C, and 2D are diagrams that illustrate particular aspects of data reduction operations performable by the ice detection system of FIG. 1 according to one or more implementations.

FIG. 2A illustrates an example of an image 200 captured by the camera 104C of FIG. 1. For example, the image 200 depicts a forward portion of the fuselage 112 of the aircraft 100, the wings 106 of the aircraft 100, and several ground-based features, such as the ground equipment 122 and the ice or water 124 of FIG. 1.

Figure 2B:
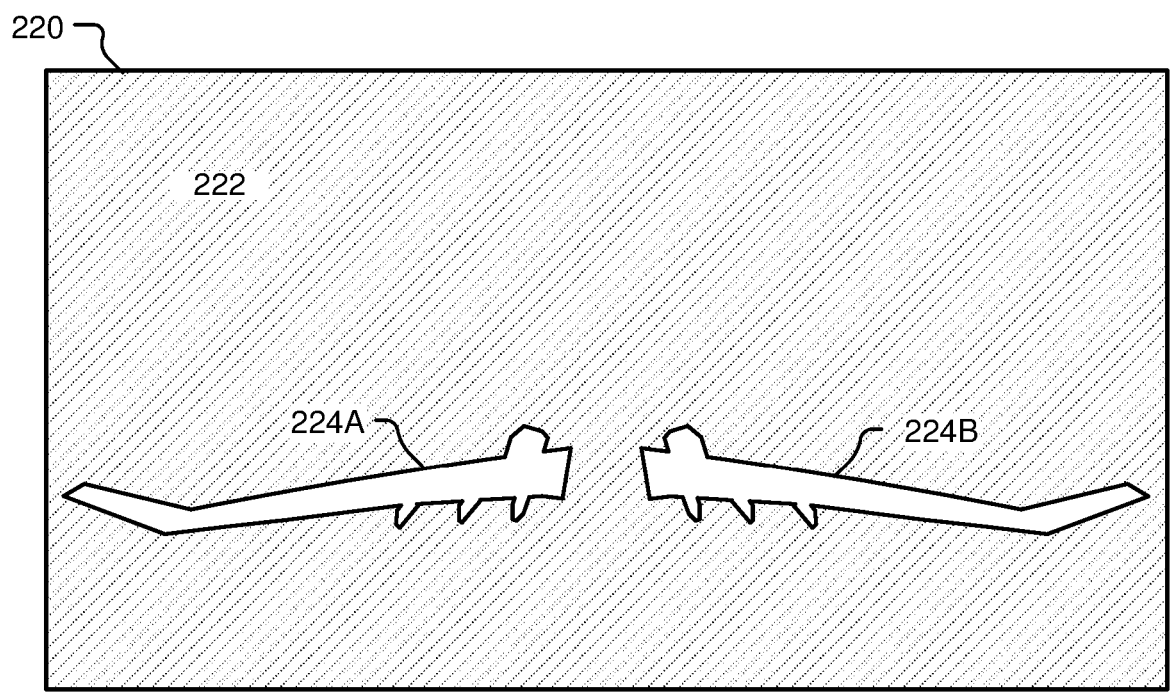

FIG. 2B illustrates an example of a pixel mask 220 to be applied to the image 200. The pixel mask 220 includes a first region 222 corresponding to pixels that are to be removed from the image 200, and one or more second regions 224 corresponding to pixel of the image 200 that are to be retained.

In a particular implementation, the pixel mask 220 is selected based on the aircraft type of the aircraft 100 depicted in the image 200. For example, the aircraft type may be indicated in the additional data 170 provided to the ice detect system 102, and the ice detection system 102 may select the pixel mask 220 that is to be used based on the aircraft type. In other implementations, such as when the ice detection system 102 corresponds to an LRU of a particular aircraft, a default pixel mask 220 is used for images from a particular camera 104 since the field of view of each camera 104 is fixed and associated with a single aircraft 100.

Figure 2C:
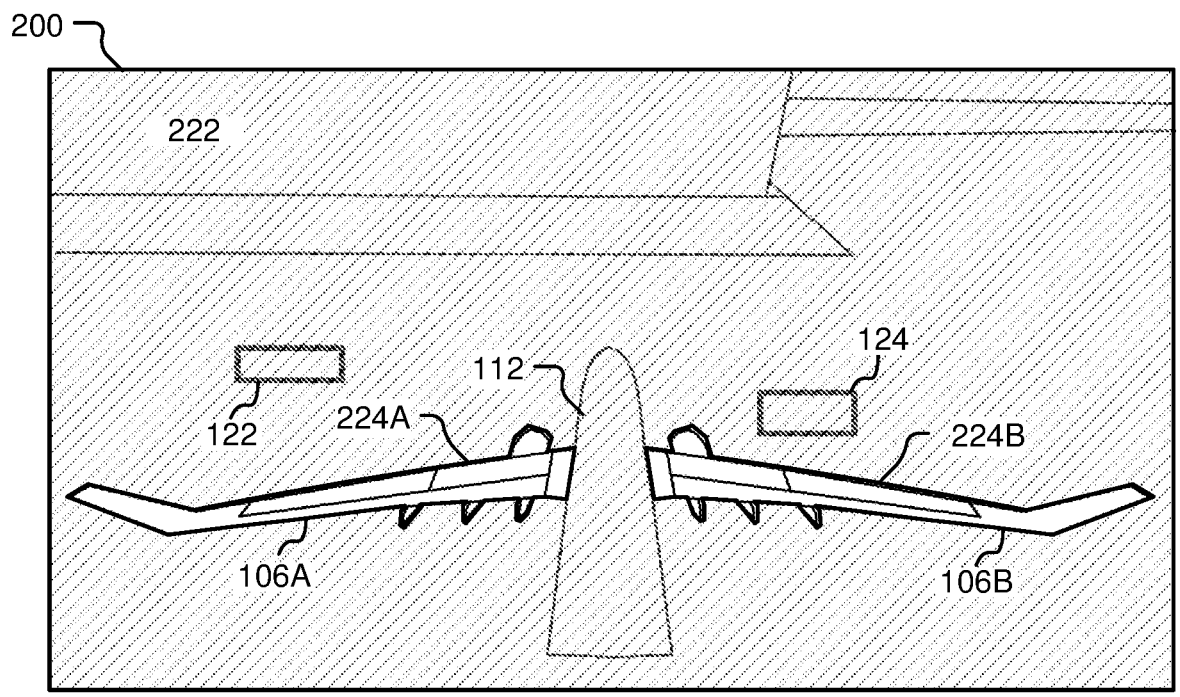

FIG. 2C illustrates an example of the image 200 overlaid with the pixel mask 220. As shown in FIG. 2C, the first region(s) 222 of the pixel mask 220 is configured to cover portions of the image 200 that do not depict surfaces of interest of the aircraft 100. For example, the first region(s) 222 of the pixel mask 220 covers a portion of the image 200 that depicts the ground-based features (e.g., the ground equipment 122 and the ice or water 124) in the image 200. Additionally, in the example of FIG. 2C, the first region(s) 222 of the pixel mask 220 covers a portion of the image 200 that depicts the fuselage 112. In contrast, the second region(s) 224 of the pixel mask 220 cover portions of the image 200 that depict the wings 106 of the aircraft 100.

Figure 2D:
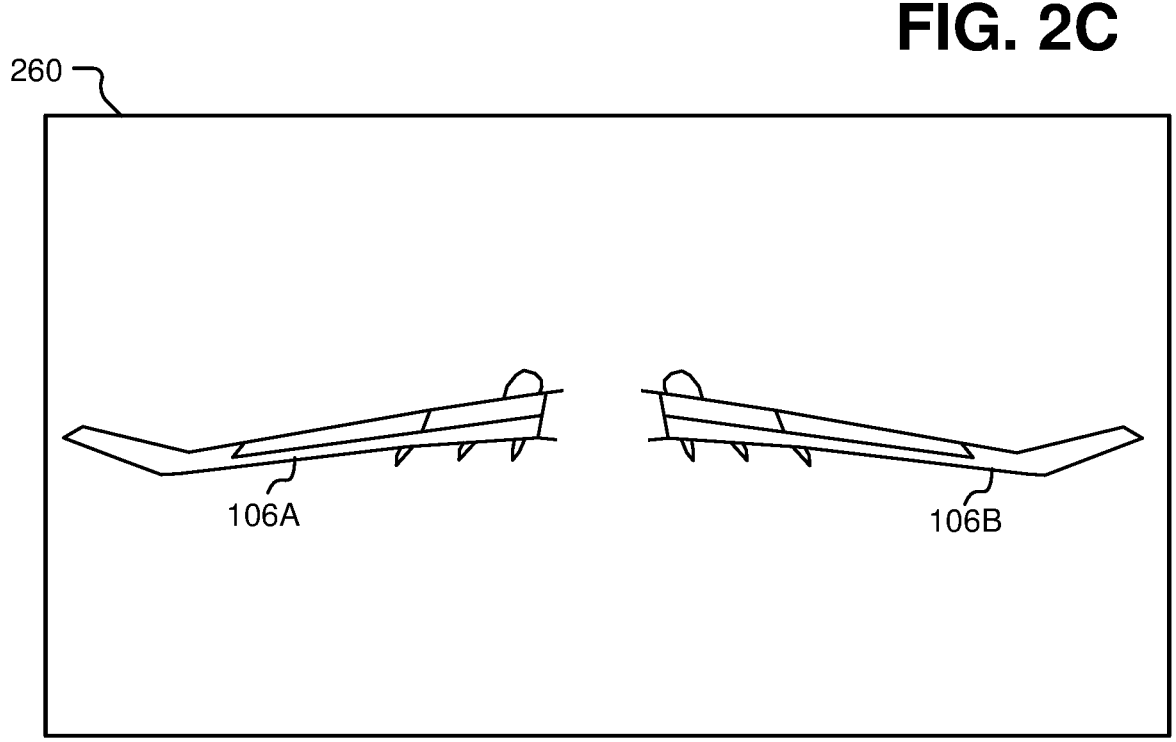

FIG. 2D illustrates an example of the image 260 after pixel of the image 200 covered by first region(s) 222 of the pixel mask 220 are removed. In the example of FIGS. 2A-2D, the image 260 is used rather than the image 200 for ice detection. In this example, pixel data related to portions of the image 200 that represent the wings 106 are retained and other pixel data of the image 200 are omitted. As a result, computing resources associated with feature extraction and ice detection are significantly reduced.

The operations described with reference to FIGS. 2A-2D may be performed for each image of the second series of images 156. As noted above, one or more images of the first series of images 152 may also be omitted from the second series of images 156, which further reduces computing resources associated with feature extraction and ice detection.

In FIG. 2B, the second region(s) 224 are configured to retain pixels representing the wings 106; however, in other implementations, the second region(s) 224 may be configured to retain pixels representing other portions of the aircraft 100, such as portions of the fuselage 112. Additionally, while the image 200 used as in example in FIGS. 2A-2D includes the field of view 118 of the camera 104C mounted on the tail structure 108 of the aircraft 100 of FIG. 1, similar operations (with different pixel masks) may be performed for images captured by other cameras with different fields of view, such as the camera 104A, the camera 104B, or both.

In some implementations, rather than using a default pixel mask or a pixel mask selected based on the aircraft type, the ice detection system 102 dynamically determines the pixel mask 220. For example, the preprocessor 154 performs edge detection to identify boundaries of the second region(s) 224 of the pixel mask 220 based on edges of the aircraft 100 as represented in an image.

Figure 3:
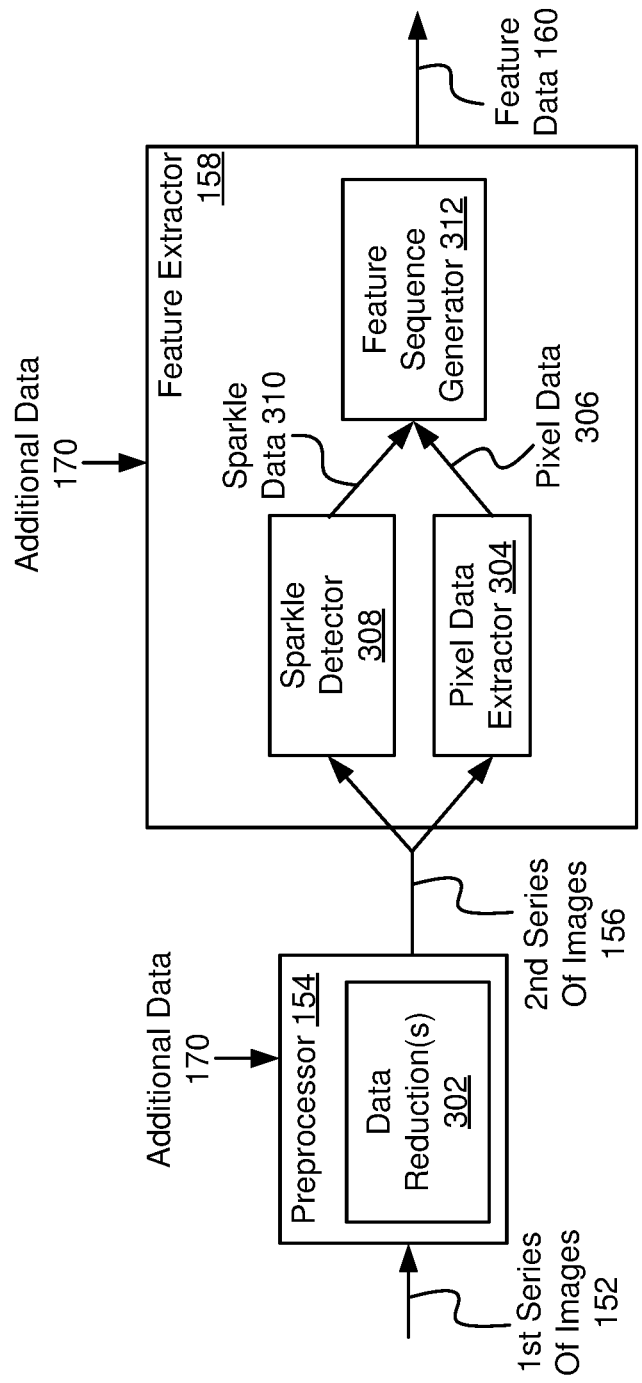
FIG. 3 is a block diagram that illustrates particular aspects of operations performable by the ice detection system of FIG. 1 according to one or more implementations.

FIG. 3 is a block diagram that illustrates particular aspects of operations performable by the ice detection system of FIG. 1 according to one or more implementations. In particular, FIG. 3 illustrates further details of the preprocessor 154 and the feature extractor 158 according to a particular implementation.

In FIG. 3, the preprocessor 154 is configured to obtain the first series of images 152 and to perform one or more data reduction operations 302 to generate the second series of images 156. The data reduction operations 302 include reducing the count of images, reducing the quantity of data representing each image, or both. For example, the second set of images 156 may include fewer images than the first set of images 152. To illustrate, a particular data reduction operation of the data reduction operations 302 includes selectively omitting one or more images of the first set of images 152. For example, an image may be selected for omission based on the image's position in the first series of images 152, based on its content, or based on other characteristics of the image or the first series of images 152.

As another example, one or more images of the second series of images 156 may include fewer pixels than one or more corresponding images of the first series of images 152. To illustrate, as described with reference to FIGS. 2A-2D, pixel data associated with portions of an image that do not depict surfaces of the aircraft 100 may be omitted from the image (e.g., using a pixel masking process). In another illustrative example, a set of pixels of an image of the first series of images 152 may be combined to form a smaller set of pixels. As one example of this process, a pixel of an image of the second series of images 156 may have pixel values based on an average (or a weighted average) of two or more adjacent pixels of a corresponding image of the first series of images 152. In some examples, the second series of images 156 may include fewer images than the first series of images 152 and each image of the second series of images 156 may include fewer pixels than its corresponding image of the first series of images 152.

In some implementations, the data reduction operations 302 are based, at least in part, on the additional data 170. For example, the data reduction operations 302 may use portions of the additional data 170 to determine which pixels of an image of the first series of images 152 to omit to generate an image of the second series of images 156. As another example, the data reduction operations 302 may use portions of the additional data 170 to determine which image(s) of the first series of images 152 to drop to generate the second series of images 156. For example, a frame rate (e.g., a number of images for a particular time period) of the second series of images 156 may be determined based on weather conditions associated with the aircraft. To illustrate, a higher frame rate (corresponding to retention in the second series of images 156 of more images of the first series of images 152) may be used when weather conditions indicated in the additional data 170 represent a higher risk of ice formation and a lower frame rate (corresponding to retention in the second series of images 156 of fewer images of the first series of images 152) may be used when weather conditions indicated in the additional data 170 represent a lower risk of ice formation. As another example, in low illumination conditions, fewer pixels of an image of the first series of images 152 may be combined to generate an image of the second series of images 156.

The feature extractor 158 is operable to generate the feature data 160 based on the second series of images 156. In the example illustrated in FIG. 3, the feature extractor 158 includes a pixel data extractor 304 configured to provide particular pixel data 306 to a feature sequence generator 312. For example, the pixel data 306 may be based on any color space model, such as Red, Green, and Blue values of an RGB color space model or Hue, Saturation, and Brightness values of an HSB color space model.

In FIG. 3, the feature extractor 158 also includes a sparkle detector 308. The sparkle detector 308 is configured to generate sparkle data 310 indicating pixels associated with sparkle. In this context, "sparkle" refers to rapid changes in illumination intensity associated with one or more adjacent pixels. Ice crystals can include a large number of small facets, which can cause sparkle as a result of minor changes in how light strikes them (e.g., due to changes in the illumination source or small movements of the aircraft). Since sparkle is related to changes in intensity, the sparkle data 310 is determined from two or more images of the second series of images 156. To illustrate, a pixel may be identified as associated with sparkle based on M images of the second series of images, where M is an integer greater than one. In the example illustrated in FIG. 3, the sparkle data 310 is provided to the feature sequence generator 312.

The feature sequence generator 312 is configured to generate data indicating patterns over time in pixel data 306, the sparkle data 310, or both. As one example, a pattern over time in the pixel data 306 may be represented by evaluating time-windowed portions of the pixel data 306, where each time window represents data from multiple images of the second series of images (e.g., P images, where P is an integer greater than 1). In this example, coefficients of a polynomial representing a line fit to the values of the pixel data can be determined for each time-windowed portion, such that each set of coefficients represents a pattern over time for the time-windowed portion. In other examples, other techniques are used to describe patters over time in the pixel data 306, the sparkle data 310, or both.

The feature data 160 output by the feature extractor 158 include data representing the patterns over time in the pixel data 306, the sparkle data 310, or both. As one example, the feature sequence generator 312 may include a sequence-based encoding network (e.g., a trained machine-learning model) that is configured to receive input data representing a time-windowed portion of the second series of images 156 (e.g., a set of pixel data 306 representing multiple images of the second series of images 156, sets of sparkle data 310 representing multiple images of the second series of images 156, or both) and to generate one embedding vector representing the time-windowed portion of the second series of images 156. In this example, the feature sequence generator

312 may include a temporally dynamic machine-learning model, such as a recurrent neural network, or a self-attention network (e.g., a transformer).

In some implementations, the feature data 160 is also based at least partially on the additional data 170. For example, the additional data 170 may include an identifier of the aircraft 100 (e.g., a tail number) or information that can be used to determine the identifier of the aircraft 100 (e.g., an operator and flight number). In this example, the feature extractor 158 may determine surface paint color(s) of the aircraft 100 based on the identifier of the aircraft 100, and the feature data 160 may include the surface paint color(s). Additionally, or alternatively, information included in the feature data 160 may be determined based on the surface paint color(s). To illustrate, a pattern over time indicated in the feature data 160 may indicate a detected color change relative to the surface paint color(s).

Although FIG. 3 illustrates the feature extractor 158 as including the sparkle detector 308, in other implementations, a reflection detector can be used instead of the sparkle detector 308. In such implementations, the reflection detector is operable to detect pixels associated with very high illumination relative to nearby pixels. Such localized areas of high illumination can correspond to reflections of light sources toward the camera, such as reflections from icy areas. Reflections can be detected in individual images, rather than by comparing multiple images to detect sparkle.

Although FIG. 3 illustrates the pixel data extractor 304 and the sparkle detector 308 as operating in parallel on the second series of images 156, in other implementations, the sparkle detector 308 (or a reflection detector) receives the pixel data 306 from the pixel data extractor 304 and detects sparkle or reflections based on the pixel data 306. In still other implementations, the sparkle detector 308 is omitted; and sparkle, reflections, or similar data are determined by the feature sequence generator 312.

Figure 4:
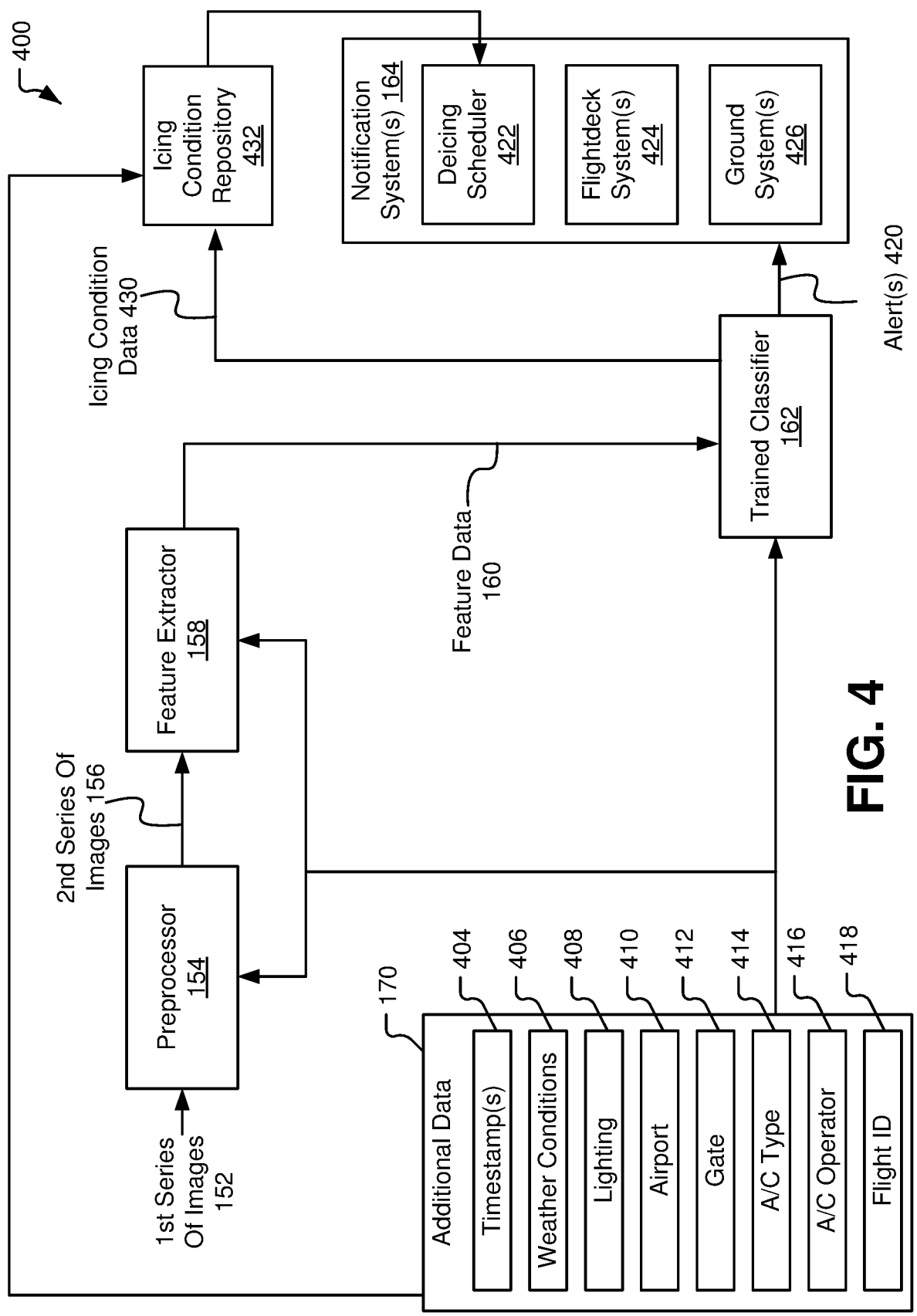
FIG. 4 is a block diagram of a system that includes aspects of the ice detection system of FIG. 1 according to one or more implementations.

FIG. 4 is a block diagram of a system 400 that includes aspects of the ice detection system 102 of FIG. 1 according to one or more implementations. In the example of FIG. 4, the system 400 includes the preprocessor 154, the feature extractor 158, and the trained classifier 162 of the ice detection system 102 of FIG. 1.

In FIG. 4, the additional data 170 includes information descriptive of circumstances in which the first series of images 152 where captured. For example, the additional data 170 includes one or more timestamps 404. In this example, the timestamp(s) 404 may include a timestamp associated with each image of the first series of images 152, a timestamp associated with an analysis by the ice detection system 102 (e.g., when an ice detection operation was initiated), etc. The timestamp(s) 404 include information indicating a time of day, a day of the week, a date (e.g., day, month, and year), etc.

In FIG. 4, the additional data 170 also includes weather conditions data 406. The weather conditions data 406 indicates, for example, an ambient temperature, humidity information, precipitation information, wind information, cloud conditions (e.g., overcast, sunny, etc.), other information pertinent to formation of ice, or a combination thereof. The weather conditions data 406 may receive from one or more sensors onboard an aircraft (e.g., the sensors 116 of FIG. 1), from one or more sensors offboard the aircraft (e.g., from sensors at an airport), from one or more weather data services, or a combination thereof.

In FIG. 4, the additional data 170 also includes lighting data 408. The lighting data 408 indicates a light source in use when the first series of images 152 were captured. For example, the light source could be natural lighting (e.g., sunlight) or artificial lighting. In some implementations, the lighting data 408 include additional detail about lighting conditions, such as an angle or position of a light source relative to an aircraft when the first series of images 152 were captured, an illumination intensity when the first series of images 152 were captured, etc. In some implementations, the lighting data 408 include default data for a time of day and a location at a particular airport. For example, nighttime lighting at a first gate of the airport may be less intense or less direct than nighttime lighting at another gate of the airport. The lighting data 408 may be received from one or more sensors onboard an aircraft (e.g., the sensors 116 of FIG. 1), from one or more sensors offboard the aircraft (e.g., from sensors at an airport), from default data associated with the airport (e.g., data descriptive of lighting at gates of the airport), or a combination thereof.

In FIG. 4, the additional data 170 also include airport data 410 and gate data 412. The airport data 410 includes, for example, International Air Transport Association (IATA) airport code of the airport, coordinates of the airport, other identifying information associated with the airport, other information, or a combination thereof. The gate data 412 specifies a particular gate at which the aircraft is parked when the first series of images 152 is captured. In some implementations, the gate data 412 may be replaced with, or supplemented by, data specifying other locations at an airport, such as taxiway identifiers, hold point identifiers, deicing station identifiers, or other locations at which an aircraft parks or stops.

In FIG. 4, the additional data 170 also include information about the aircraft depicted in the first series of images 152, such as the aircraft type 414 ("A/C type" in FIG. 4), the aircraft operator 416 ("A/C operator" in FIG. 4), the flight identifier 418 ("flight ID in FIG. 4), other information descriptive of the aircraft, or a combination thereof. In some implementations, the information descriptive of the aircraft is determined from a system onboard the aircraft.

The preprocessor 154 of FIG. 4 is configured to perform one or more data reduction operations as described with reference to FIG. 1, 2A-2D, or 3, above. In some implementations, the preprocessor 154 is configured to receive at least some of the additional data 170 and aspects of operation of the preprocessor 154 are determined based on the additional data 170. For example, the data reduction operations performed by the preprocessor 154 may be based on the time of day indicated by the timestamp(s) 404, the weather conditions indicated by the weather conditions data 406, the lighting conditions indicated by the lighting data 408, information descriptive of the aircraft (e.g., the aircraft type 414, the aircraft operator 416, or the flight identifier 418), the location of the aircraft (e.g., based on the airport data 410, the gate data 412, or both), or a combination thereof.

The feature extractor 158 is operable to generate feature data 160 based on the second series of images 156, as described with reference to FIGS. 1 and 3. In some implementations, the feature extractor 158 is configured to receive at least some of the additional data 170 and aspects of operation of the feature extractor 158 are determined based on the additional data 170. For example, the feature extraction operations performed by the feature extractor 158 may be based on the time of day indicated by the timestamp(s) 404, the weather conditions indicated by the weather conditions data 406, the lighting conditions indicated by the lighting data 408, information descriptive of the aircraft (e.g., the aircraft type 414, the aircraft operator 416, or the flight identifier 418), the location of the aircraft (e.g., based on the airport data 410, the gate data 412, or both), or a combination thereof.

The trained classifier 162 is operable to determine whether ice is present on one or more surfaces of the aircraft, as described with reference to FIG. 1. The input data to the trained classifier 162 includes at least a portion of the feature data 160. In some implementations the input data to the trained classifier 162 also includes at least a portion of the additional data 170. Depending on training of the trained classifier 162, the input data includes, for example, information based on the timestamp(s) 404 (e.g., the time of day, the day of the year, the season, etc.), the weather conditions indicated by the weather conditions data 406, the lighting conditions indicated by the lighting data 408, information descriptive of the aircraft (e.g., the aircraft type 414, the aircraft operator 416, or the flight identifier 418), the location of the aircraft (e.g., based on the airport data 410, the gate data 412, or both), or a combination thereof.

If the trained classifier 162 detects ice (or suspected ice) on a surface of an aircraft, the ice detection system 102 sends one or more alerts 420 to the notification system(s) 164. In FIG. 4, the notification system(s) 164 includes one or more ground systems 426, one or more flightdeck systems 424, one or more deicing schedulers 422, or a combination thereof. The ground system(s) 426 include, for example, airport traffic management systems, aircraft schedulers, aircraft operator systems, a deicing dispatch system, etc. The flightdeck system(s) 424 include, for example, one or more lights or other onboard indicators, one or more aircraft interface devices, one or more electronic flight bag devices, or a combination thereof. The deicing scheduler 422 includes, for example, a device or system that schedules and/or dispatches deicing equipment at the airport.

In the example illustrated in FIG. 4, the trained classifier 162 (or another component of the ice detection system 102 of FIG. 1) is configured to provide icing condition data 430 to an icing condition repository 432. In a particular implementation, the icing condition data 430 includes the alert(s) 420 or other data indicating when the trained classifier 162 detects ice (or suspected ice) on a surface of an aircraft. In some implementations, the icing condition data 430 also indicates when the trained classifier 162 does not detect ice (or suspected ice) on a surface of an aircraft. Further, in some implementations, at least a portion of the additional data 170 is provided to the icing condition repository 432. For example, the ice detection system 102 of FIG. 1 may send the icing condition data 430 and at least a portion of the additional data 170 to the icing condition repository 432. In other examples, one or more other systems send at least the portion of the additional data 170 to the icing condition repository 432.

Based on the icing condition data 430 and the additional data 170, the icing condition repository 432 is usable for resource planning at a particular airport or by a particular aircraft operator. For example, the deicing scheduler 422 is able to access historical information from the icing condition repository 432 to determine whether to prepare particular deicing resources based on a weather forecast, where to pre-position deicing resources based on the weather forecast, etc. As another example, an aircraft operator is able to access historical information from the icing condition repository 432 to plan a flight schedule to account for possible icing at a particular airport or gate.

Although the notification system(s) 164 are illustrated in FIG. 4 as including the ground system(s) 426, the flightdeck system(s) 424, and the deicing scheduler 422, in other implementations, the notification system(s) 164 include more, fewer, or different systems that are configured to receive alerts 420 from ice detection systems of one or more aircraft. Additionally, or alternatively, although the additional data 170 are illustrated in FIG. 4 as including the timestamp(s) 404, the weather conditions data 406, the lighting data 408, the airport data 410, the gate data 412, the aircraft type 414, the aircraft operator 416, and the flight identifier 418, in other implementations, the additional data 170 include more, fewer, or different data.

In some implementations, the trained classifier 162 is a binary classifier. For example, output of the trained classifier indicates that ice is detected (or suspected) on a surface of an aircraft or indicates that ice is not detected (or suspected) on a surface of an aircraft. In other implementations, the trained classifier 162 is a multiclass classifier where at least one of the classes corresponds to detection of ice on a surface of the aircraft. For example, the trained classifier 162 may also be trained to detect presence of deicing fluid on a surface of the aircraft.

In some implementations, in addition to indicating whether ice is detected (or suspected) on a surface of an aircraft, the trained classifier outputs information indicating a confidence score. In such examples, the confidence score indicates how confident the trained classifier 162 that ice is present (or not present) on the surface of the aircraft. In such implementations, the alert(s) 420, the icing condition data 430, or both, may also indicate the confidence score.

Figure 5:
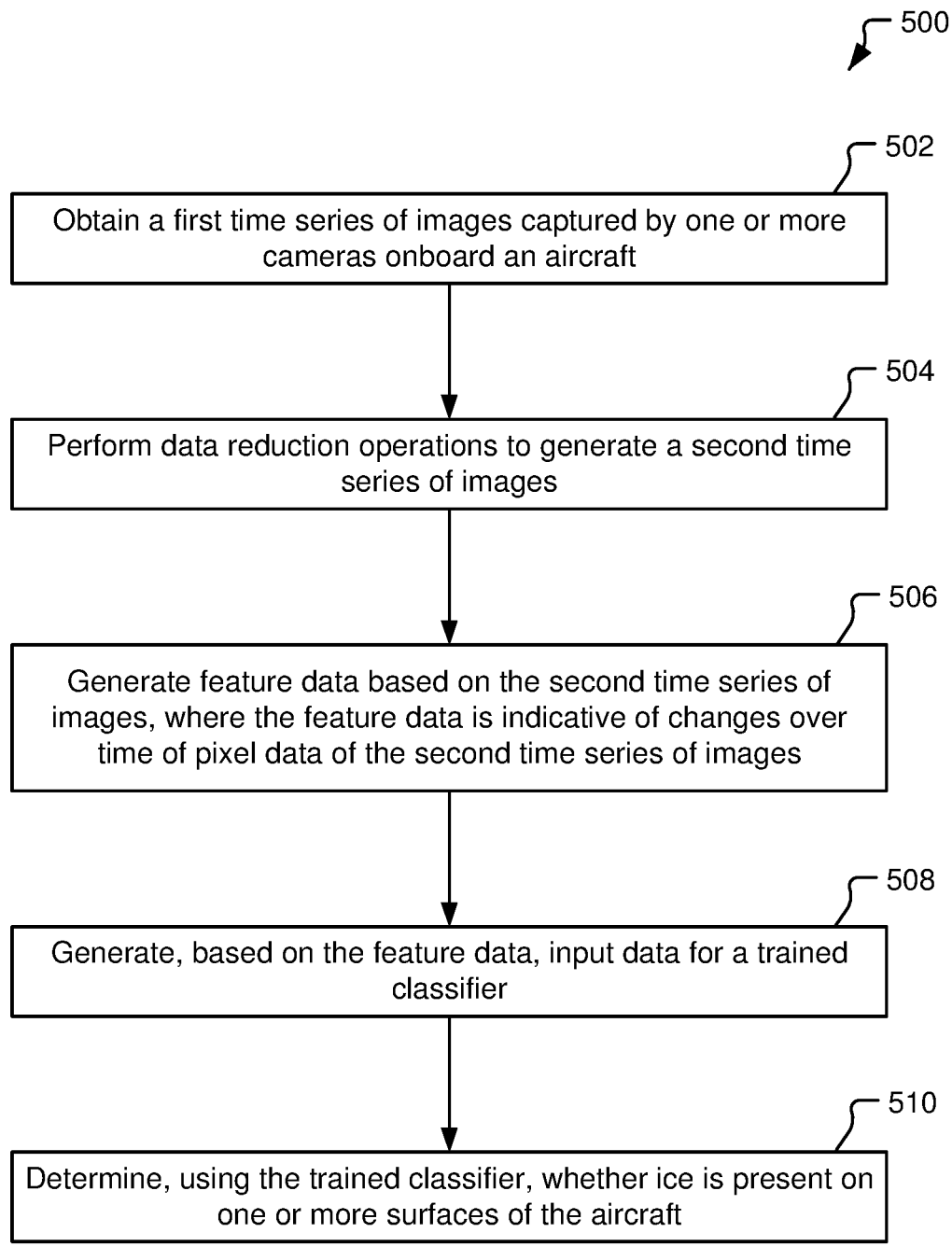
FIG. 5 is a flowchart of a method of detecting ice on a surface of an aircraft utilizing the ice detection system of FIG. 1 according to one or more implementations.

FIG. 5 is a flowchart of a method 500 of detecting ice on a surface of an aircraft, such as the aircraft 100 of FIG. 1. In a particular implementation, the method 500 is initiated, performed, or controlled by one or more processors of a computing device, such as by the ice detection system of FIG. 1.

In FIG. 5, the method 500 includes, at block 502, obtaining a first series of images captured by one or more cameras onboard an aircraft. For example, the cameras 104 of FIG. 1 may capture sequences of images, such as the first series of images 152. The cameras include, for example, one or more cameras disposed on a tail structure of the aircraft, one or more cameras disposed on wingtip structures of the aircraft, or a combination thereof. In a particular implementation, the cameras are also configured to provide an inflight view of the aircraft to an inflight entertainment system.

In FIG. 5, the method 500 includes, at block 504, performing data reduction operations to generate a second series of images. For example, in FIG. 1, the preprocessor 154 is operable to obtain the first series of images 152 and to perform data reduction operations to generate the second series of images 156. In some implementations, the data reduction operations include removing pixel data that do not depict surfaces of the aircraft from a particular image. To illustrate, pixel masking operations as described with reference to FIGS. 2A-2D can be performed to removed pixels that do not represent surfaces of the wings 106, the fuselage 112, or other surfaces of the aircraft 100. In some such implementations, an indication of an aircraft type of the aircraft, is used to select a pixel mask. In the same or different implementations, the data reduction operations include omitting one or more images of the first series of images 152 from the second series of images 156. In the same or different implementations, the data reduction operations include combining pixel data values of two or more pixels of a first image of the first series of images 152 to generate a first image of the second series of images 156.

In FIG. 5, the method 500 includes, at block 506, generating feature data based on the second series of images. The feature data is indicative of changes over time of pixel data of the second series of images. For example, the feature extractor 158 of FIG. 1 or FIG. 3 can generate the feature data 160. In a particular implementation, the feature extractor 158 includes the feature sequence generator 312, which is configured to generate data indicative of changes over time in the pixel data 306. In some implementations, the feature data also includes values indicative of sparkle or reflections in one or more images. In some implementations, the content of the feature data 160 is based at least partially on data other than the second series of images, such as the additional data 170. To illustrate, the additional data 170 may be used to determine a base paint color of the aircraft, and the feature data 160 may indicate deviations from expected pixel values based on the base paint color.

In FIG. 5, the method 500 includes, at block 508, generating, based on the feature data, input data for a trained classifier. In some implementations, the input data includes all of or a portion of the feature data 160. In the same or different implementations, the input data includes one or more embedding vectors or other data representative of characteristics of the feature data 160.

In FIG. 5, the method 500 includes, at block 510, determining, using the trained classifier, whether ice is present on one or more surfaces of the aircraft. For example, the input data may be provided to the trained classifier 162 to determine whether ice is present on a surface of the aircraft 100. As explained above, the input data may include at least a portion of the feature data 160. Additionally, in some implementations, the input data include one or more data elements of the additional data 170. To illustrate, the input data may include data indicating one or more timestamps 404, one or more weather conditions 406, an identifier of an airport 410, an identifier of an aircraft type 414, an identifier of an aircraft operator 416, one or more other data elements of the additional data 170, or a combination thereof.

In some implementations, the method 500 also includes, generating an alert 420 based on detection of ice on the one or more surfaces. For example, the ice detection system 102 may send the alert(s) 420 to the notification system(s) 164.

In the same or different implementations, the method 500 includes, storing, at an icing condition repository, data indicating whether ice is detected. In some implementations, the data stored to the icing condition repository also includes other information, such as data indicating one or more weather conditions, one or more time stamps, an identifier of an airport, an identifier of an aircraft type, an identifier of an aircraft operator, an identifier of a gate, or any combination thereof. In some such implementations, historical data of the icing condition repository is usable to schedule deicing resources at a particular airport. For example, the historical data may indicate that aircraft at some gates tend to experience icing when particular weather conditions prevail more than aircraft at other gates. In this example, the deicing resources are scheduled to operate at the gates that have a higher likelihood of icing in view of the historical data.

The method 500 enables onboard systems of an aircraft (such as pre-existing, conventional digital cameras) to be used to detect ice on the aircraft. The method 500 is able to significantly reduce the time and resources (e.g., ground-based inspection equipment) used for ice detection and is able to reduce delays due to ice inspections.

Figure 6:
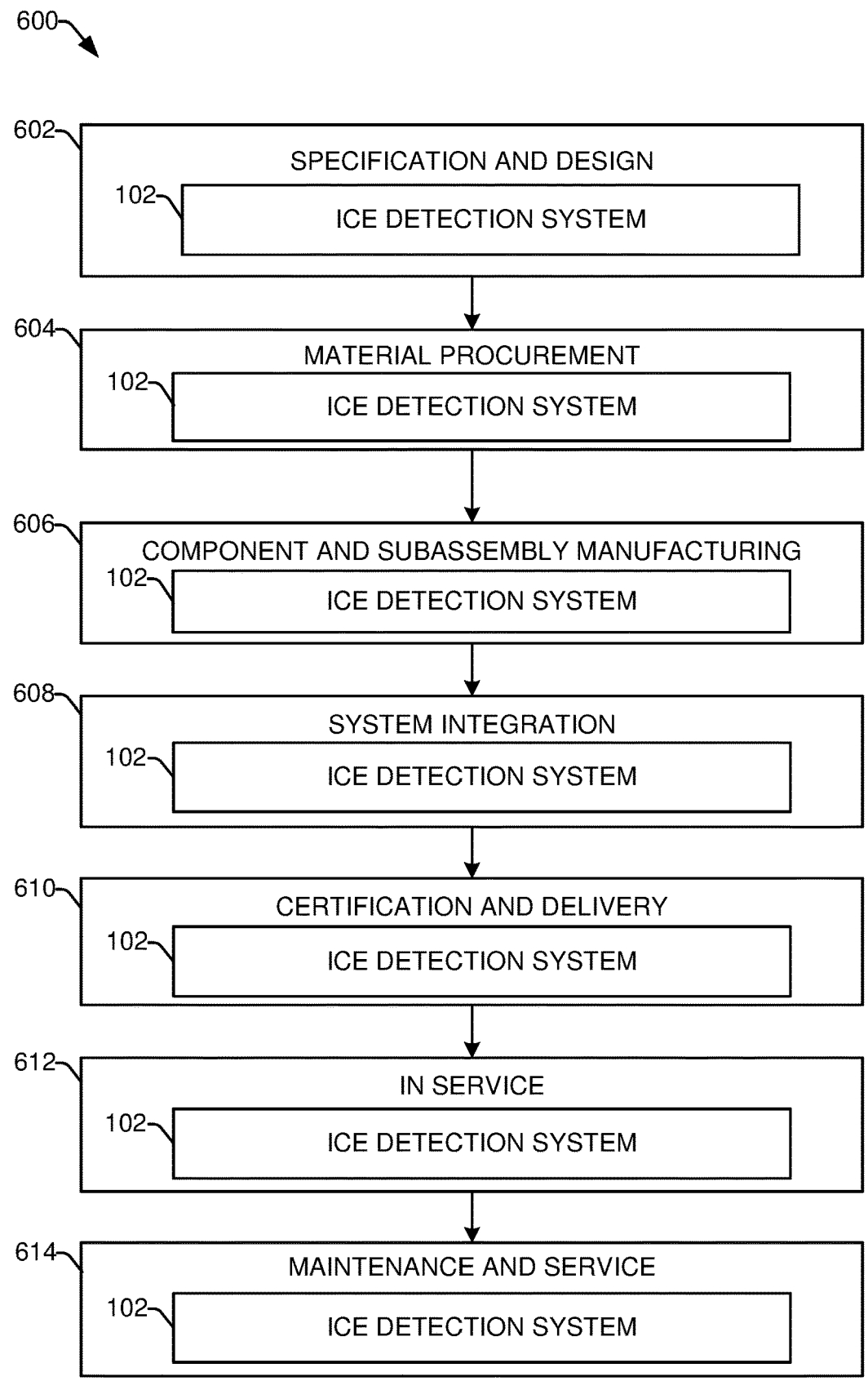
FIG. 6 is a flowchart illustrating an example of a life cycle of an aircraft that includes the ice detection system of FIG. 1 according to one or more implementations.

FIG. 6 is a flowchart illustrating an example of a life cycle 600 of an aircraft (e.g., the aircraft 100) that includes the ice detection system 102 of FIG. 1 according to one or more implementation. During pre-production, the exemplary life cycle 600 includes, at 602, specification and design of an aircraft, such as the aircraft 100 of FIG. 1. During specification and design of the aircraft, the life cycle 600 includes specification and design of one or more LRUs, such as an LRU including the ice detection system 102. At 604, the life cycle 600 includes material procurement, which includes procuring materials for the ice detection system 102.

During production, the life cycle 600 includes, at 606, component and subassembly manufacturing and, at 608, system integration of the aircraft. For example, the life cycle 600 includes component and subassembly manufacturing of the ice detection system 102 and system integration of the ice detection system 102. At 610, the life cycle 600 includes certification and delivery of the aircraft and, at 612, placing the aircraft in service. Certification and delivery include certification of the ice detection system 102 to place the ice detection system 102 in service. While in service by a customer, the aircraft is scheduled for routine maintenance and service (which includes modification, reconfiguration, refurbishment, and so on). At 614, the life cycle 600 includes performing maintenance and service on the aircraft, which includes performing maintenance and service on the ice detection system 102.

Each of the processes of the life cycle 600 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

Figure 7:
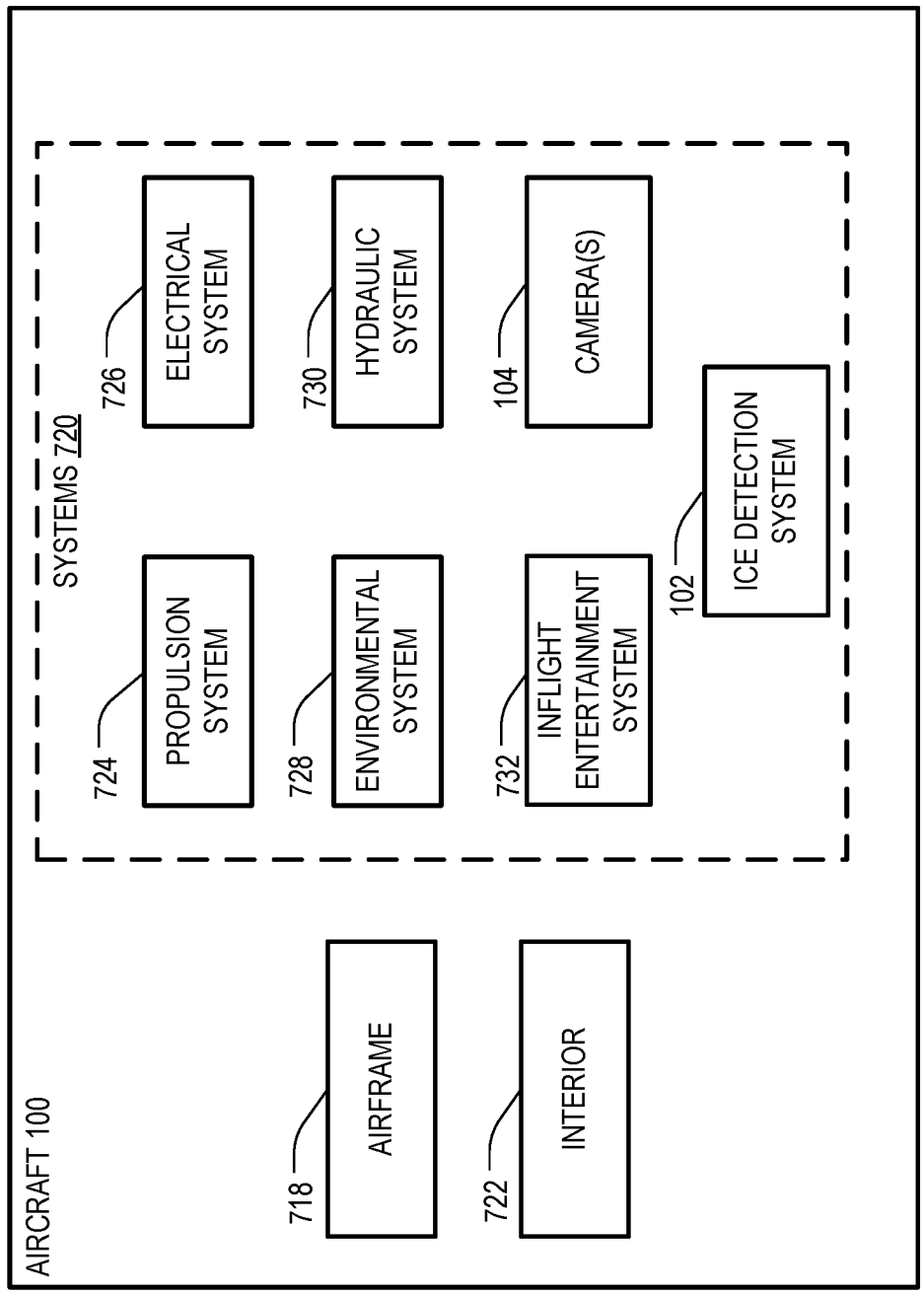
FIG. 7 is a block diagram of an example of an aircraft that includes the ice detection system of FIG. 1 according to one or more implementations.

FIG. 7 is a block diagram of an example of the aircraft 100 that includes the ice detection system 102 of FIG. 1 according to one or more implementation. In the example of FIG. 7, the aircraft 100 includes an airframe 718 with a plurality of systems 720 and an interior 722. Examples of the plurality of systems 720 include one or more of a propulsion system 724, an electrical system 726, an environmental system 728, a hydraulic system 730, an inflight entertainment system 732, the camera(s) 104, and the ice detection system 102. Any number of other systems may also be included.

FIG. 8 is a block diagram of a computing environment 800 including a computing device 810 configured to support aspects of computer-implemented methods and computer-executable program instructions (or code) according to the present disclosure. For example, the computing device 810, or portions thereof, is configured to execute instructions to initiate, perform, or control one or more operations described with reference to FIGS. 1-7.

The computing device 810 includes one or more processors 820. The processor(s) 820 are configured to communicate with system memory 830, one or more storage devices 840, one or more input/output interfaces 850, one or more communications interfaces 860, or any combination thereof. The system memory 830 includes volatile memory devices (e.g., random access memory (RAM) devices), nonvolatile memory devices (e.g., read only memory (ROM) devices, programmable read only memory, and flash memory), or both. The system memory 830 stores an operating system 832, which includes a basic input/output system for booting the computing device 810 as well as a full operating system to enable the computing device 810 to interact with users, other programs, and other devices. The system memory 830 stores system (program) data 836, such as images 838, the additional data 170, or a combination thereof. In FIG. 8, the images 838 include one or more images of the first series of images 152, one or more images of the second series of images 156, or both.

The system memory 830 includes one or more applications 834 (e.g., sets of instructions) executable by the processor(s) 820. As an example, the one or more applications 834 include instructions executable by the processor(s) 820 to initiate, control, or perform one or more operations described with reference to FIGS. 1-7. To illustrate, the one or more applications 834 include instructions executable by the processor(s) 820 to initiate, control, or perform one or more operations described with reference to the ice detection system 102.

In a particular implementation, the system memory 830 includes a non-transitory, computer readable medium storing the instructions that, when executed by the processor(s) 820, cause the processor(s) 820 to initiate, perform, or control operations to detect ice on a surface of an aircraft. For example, the operations include obtaining a first series of images captured by one or more cameras onboard an aircraft; performing data reduction operations to generate a second series of images; generating feature data (e.g., data indicative of changes over time of pixel data of the second series of images) based on the second series of images; generating, based on the feature data, input data for a trained classifier; and determining, using the trained classifier, whether ice is present on one or more surfaces of the aircraft.

The one or more storage devices 840 include nonvolatile storage devices, such as magnetic disks, optical disks, or flash memory devices. In a particular example, the storage devices 840 include both removable and non-removable memory devices. The storage devices 840 are configured to store an operating system, images of operating systems, applications (e.g., one or more of the applications 834), and program data (e.g., the program data 836). In a particular aspect, the system memory 830, the storage devices 840, or both, are tangible computer-readable media. In a particular aspect, one or more of the storage devices 840 are external to the computing device 810.

The one or more input/output interfaces 850 enable the computing device 810 to communicate with one or more input/output devices 870 to facilitate user interaction, to receive data for analysis, or both. For example, the one or more input/output interfaces 850 include a display interface, an input interface, etc. In some implementations, the input/output interface 850 is adapted to receive input from a user, to receive input from another computing device, or a combination thereof. In some implementations, the input/output interface 850 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, New Jersey). In some implementations, the input/output device 870 includes one or more user interface devices and displays, including some combination of buttons, keyboards, pointing devices, displays, speakers, microphones, touch screens, the camera(s) 104, the sensor(s) 116, other devices, or combinations thereof.

The processor(s) 820 are configured to communicate with devices or controllers 880 via the one or more communications interfaces 860. For example, the one or more communications interfaces 860 can include a network interface. The devices or controllers 880 can include, for example, the notification system(s) 164, one or more other devices, or any combination thereof. In some implementations, the one or more communications interfaces 860 are also configured to communicate with the icing condition repository 432.

In some implementations, a non-transitory, computer readable medium stores instructions that, when executed by one or more processors, cause the one or more processors to initiate, perform, or control operations to perform part or all of the functionality described above. For example, the instructions may be executable to implement one or more of the operations or methods of FIGS. 1-8. In some implementations, part or all of one or more of the operations or methods of FIGS. 1-8 are implemented by one or more processors (e.g., one or more central processing units (CPUs), one or more graphics processing units (GPUs), one or more digital signal processors (DSPs)) executing instructions, by dedicated hardware circuitry, or any combination thereof.

Particular aspects of the disclosure are described below in sets of interrelated Examples:

According to Example 1, a method includes: obtaining a first series of images captured by one or more cameras onboard an aircraft; performing data reduction operations to generate a second series of images; generating feature data based on the second series of images, wherein the feature data is indicative of changes over time of pixel data of the second series of images; generating, based on the feature data, input data for a trained classifier; and determining, using the trained classifier, whether ice is present on one or more surfaces of the aircraft.

Example 2 includes the method of Example 1, wherein performing the data reduction operations for a particular image includes removing, from the particular image, particular pixel data that does not depict a wing of the aircraft.

Example 3 includes the method of Example 1 or Example 2, wherein performing the data reduction operations includes omitting one or more images of the first series of images from the second series of images.

Example 4 includes the method of any of Examples 1 to 3, wherein performing the data reduction operations includes combining pixel data values of two or more pixels of a first image of the first series of images to generate a first image of the second series of images.

Example 5 includes the method of any of Examples 1 to 4, wherein at least one of the one or more cameras is disposed on a tail structure of the aircraft.

Example 6 includes the method of any of Examples 1 to 5, wherein at least one of the one or more cameras is disposed on a wingtip structure of the aircraft.

Example 7 includes the method of any of Examples 1 to 6, wherein at least one of the one or more cameras is configured to provide an inflight view of the aircraft to an inflight entertainment system.

Example 8 includes the method of any of Examples 1 to 7, wherein the feature data include values indicative of sparkle in an image.

Example 9 includes the method of any of Examples 1 to 8, wherein the input data includes at least a portion of the feature data.

Example 10 includes the method of any of Examples 1 to 9, wherein the input data further includes data indicating one or more weather conditions, one or more timestamps, an identifier of an airport, an identifier of an aircraft type, an identifier of an aircraft operator, or any combination thereof.

Example 11 includes the method of any of Examples 1 to 10, further including generating an alert based on detection of ice on the one or more surfaces.

Example 12 includes the method of any of Examples 1 to 11, further including storing, at an icing condition repository, icing condition data, wherein the icing condition data indicates whether ice is detected and further indicates one or more weather conditions, one or more time stamps, an identifier of an airport, an identifier of an aircraft type, an identifier of an aircraft operator, an identifier of a gate, or any combination thereof.

Example 13 includes the method of Example 12, further including scheduling deicing resources at a particular airport based on historical data of the icing condition repository.

Example 14 includes the method of any of Examples 1 to 13, further including obtaining an indication of an aircraft type of the aircraft, wherein one or more of the data reduction operations are performed based on the aircraft type.

Example 15 includes the method of any of Examples 1 to 14, further including: obtaining an identifier associated with the aircraft; and determining a surface paint color of the aircraft based on the identifier, wherein the feature data is generated based on the surface paint color.

According to Example 16, an aircraft includes: one or more cameras configured to generate a first series of images; and one or more processors configured to: perform data reduction operations on the first series of images to generate a second series of images; generate feature data based on the second series of images, wherein the feature data is indicative of changes over time of pixel data of the second series of images; generate, based on the feature data, input data for a trained classifier; and determine, using the trained classifier, whether ice is present on one or more surfaces of the aircraft.

Example 17 includes the aircraft of Example 16, wherein performance of the data reduction operations for a particular image includes removal of pixel data from the particular image, and wherein the particular pixel data does not depict at least one of the one or more surfaces.

Example 18 includes the aircraft of Example 16 or Example 17, further including an inflight entertainment system, wherein at least one of the one or more cameras is configured to provide an inflight view of the aircraft to the inflight entertainment system.

According to Example 19, a computing device includes: one or more processors configured to: obtain a first series of images captured by one or more cameras onboard an aircraft; perform data reduction operations on the first series of images to generate a second series of images; generate feature data based on the second series of images, wherein the feature data is indicative of changes over time of pixel data of the second series of images; generate, based on the feature data, input data for a trained classifier; and determine, using the trained classifier, whether ice is present on one or more surfaces of the aircraft.

Example 20 includes the computing device of Example 19, wherein the computing device corresponds to or is included within a line replaceable unit of the aircraft.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A method comprising:
   obtaining a first series of images captured by one or more cameras onboard an aircraft;
   determining a frame rate based on weather conditions associated with the aircraft, wherein determining the frame rate comprises:
     determining the frame rate corresponds to a first frame rate when the weather conditions represent a high risk of ice formation; and
     determining the frame rate corresponds to a second frame rate when the weather conditions represent a lower risk of ice formation than the high risk of ice formation, wherein the first frame rate is greater than the second frame rate;
   performing data reduction operations on the first series of images based on the frame rate to generate a second series of images;
   generating feature data based on the second series of images, wherein the feature data is indicative of changes over time of pixel data of the second series of images, wherein the feature data includes data identifying a location of adjacent pixels that change in illumination between a first image of the second series of images and a second image of the second series of images;
   generating, based on the feature data, input data for a trained classifier; and
   determining, using the trained classifier, whether ice is present on one or more surfaces of the aircraft.

2. The method of claim 1, wherein performing the data reduction operations for a particular image comprises removing, from the particular image, particular pixel data that does not depict a wing of the aircraft.

3. The method of claim 1, wherein performing the data reduction operations comprises omitting one or more images of the first series of images from the second series of images.

4. The method of claim 1, wherein performing the data reduction operations comprises combining pixel data values of two or more pixels of a first image of the first series of images to generate a first image of the second series of images.

5. The method of claim 4, wherein combining the pixel data values comprises:
combining a first number of pixels of the first image of the first series of images to generate the first image of the second series of images in first illumination conditions; and
combining a second number of the pixels of the first image of the first series of images to generate the first image of the second series of images in second illumination conditions, wherein the first number is less than the second number, and wherein the first illumination conditions are lower than the second illumination conditions.

6. The method of claim 1, wherein at least one of the one or more cameras is disposed on a wingtip structure of the aircraft.

7. The method of claim 1, wherein at least one of the one or more cameras is configured to provide an inflight view of the aircraft to an inflight entertainment system.

8. The method of claim 1, wherein at least one of the one or more cameras is disposed on a tail structure of the aircraft.

9. The method of claim 1, wherein the input data includes at least a portion of the feature data.

10. The method of claim 9, wherein the input data further includes data indicating the weather conditions, one or more timestamps, an identifier of an airport, an identifier of an aircraft type, an identifier of an aircraft operator, or any combination thereof.

11. The method of claim 1, further comprising generating an alert based on detection of ice on the one or more surfaces.

12. The method of claim 1, further comprising storing, at an icing condition repository, icing condition data, wherein the icing condition data indicates whether ice is detected and further indicates the weather conditions, one or more time stamps, an identifier of an airport, an identifier of an aircraft type, an identifier of an aircraft operator, an identifier of a gate, or any combination thereof.

13. The method of claim 12, further comprising scheduling deicing resources at a particular airport based on the icing condition data, based on historical data of the icing condition repository, or both.

14. The method of claim 1, further comprising obtaining an indication of an aircraft type of the aircraft, wherein one or more of the data reduction operations are performed based on the aircraft type.

15. The method of claim 1, further comprising:
obtaining an identifier associated with the aircraft; and
determining a surface paint color of the aircraft based on the identifier, wherein the feature data is generated based on the surface paint color.

16. An aircraft comprising:
one or more cameras configured to generate a first series of images; and
one or more processors configured to:
determine a frame rate based on weather conditions associated with the aircraft, wherein determination of the frame rate comprises:
determine the frame rate corresponds to a first frame rate when the weather conditions represent a high risk of ice formation; and
determine the frame rate corresponds to a second frame rate when the weather conditions represent a lower risk of ice formation than the high risk of ice formation, wherein the first frame rate is greater than the second frame rate;
perform data reduction operations on the first series of images based on the frame rate to generate a second series of images;
generate feature data based on the second series of images, wherein the feature data is indicative of changes over time of pixel data of the second series of images, wherein the feature data includes data identifying a location of adjacent pixels that change in illumination between a first image of the second series of images and a second image of the second series of images;
generate, based on the feature data, input data for a trained classifier; and
determine, using the trained classifier, whether ice is present on one or more surfaces of the aircraft.

17. The aircraft of claim 16, wherein performance of the data reduction operations for a particular image comprises removal of particular pixel data from the particular image, and wherein the particular pixel data does not depict at least one of the one or more surfaces.

18. The aircraft of claim 16, further comprising an inflight entertainment system, wherein at least one of the one or more cameras is configured to provide an inflight view of the aircraft to the inflight entertainment system.

19. A computing device comprising:
one or more processors configured to:
obtain a first series of images captured by one or more cameras onboard an aircraft;
determine a frame rate based on weather conditions associated with the aircraft, wherein determination of the frame rate comprises:
determine the frame rate corresponds to a first frame rate when the weather conditions represent a high risk of ice formation; and
determine the frame rate corresponds to a second frame rate when the weather conditions represent a lower risk of ice formation than the high risk of ice formation, wherein the first frame rate is greater than the second frame rate;
perform data reduction operations on the first series of images based on the frame rate to generate a second series of images;
generate feature data based on the second series of images, wherein the feature data is indicative of changes over time of pixel data of the second series of images, wherein the feature data includes data identifying a location of adjacent pixels that change in illumination between a first image of the second series of images and a second image of the second series of images;
generate, based on the feature data, input data for a trained classifier; and
determine, using the trained classifier, whether ice is present on one or more surfaces of the aircraft.

20. The computing device of claim 19, wherein the computing device corresponds to or is included within a line replaceable unit of the aircraft.

* * * * *